D. COLE.
APPARATUS FOR TREATING SLIMES.
APPLICATION FILED MAR. 24, 1915.
1,205,327.
Patented Nov. 21, 1916.
3 SHEETS—SHEET 1.
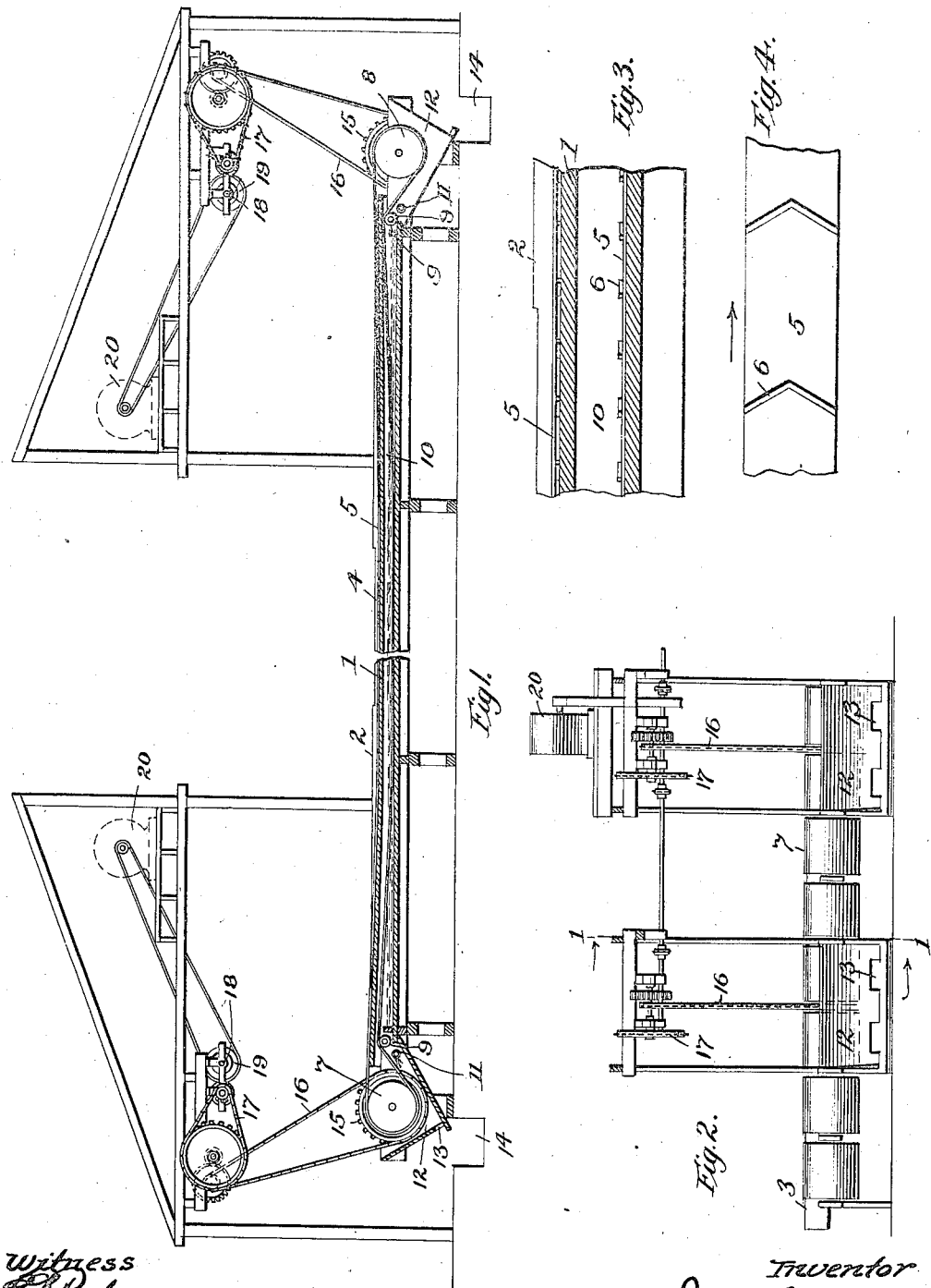

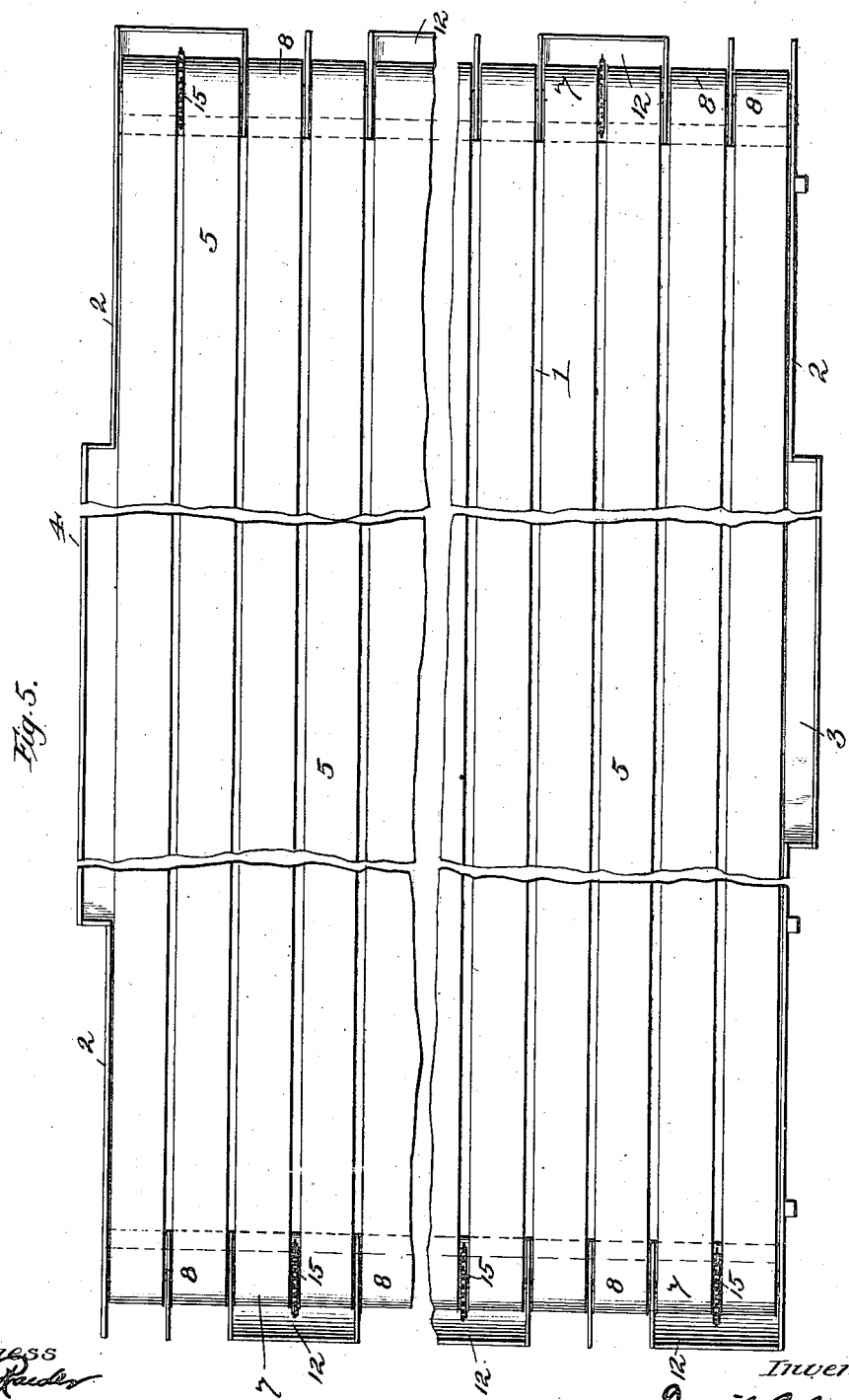

D. COLE.
APPARATUS FOR TREATING SLIMES.
APPLICATION FILED MAR. 24, 1915.
1,205,327.
Patented Nov. 21, 1916.
3 SHEETS—SHEET 3.
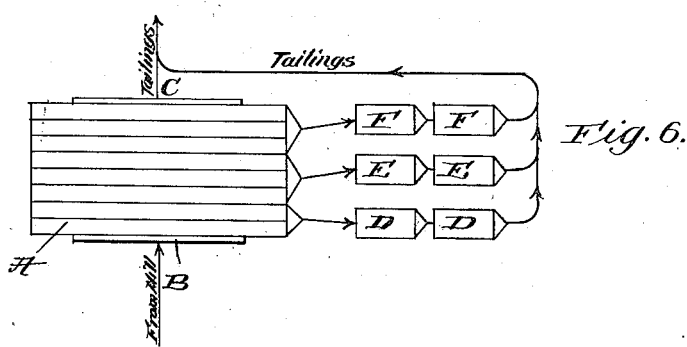
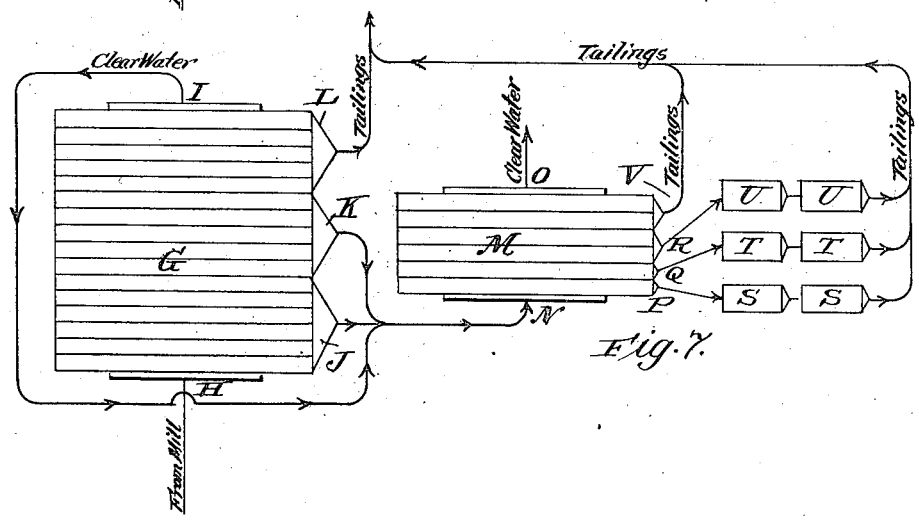
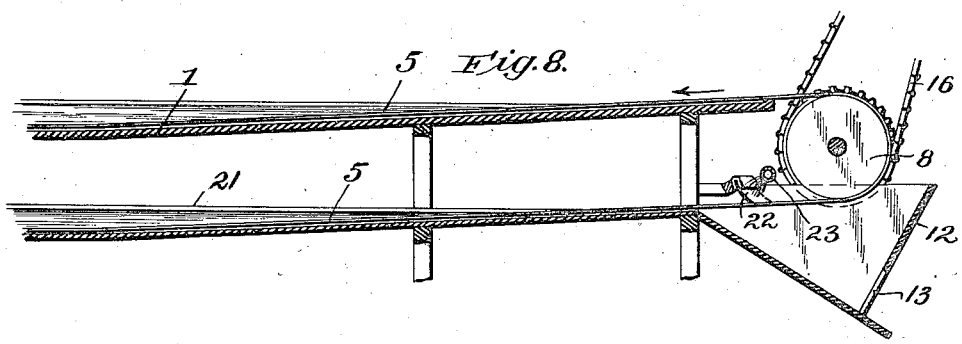

UNITED STATES PATENT OFFICE.

DAVID COLE, OF TUCSON, ARIZONA.

APPARATUS FOR TREATING SLIMES.

1,205,327. Specification of Letters Patent. Patented Nov. 21, 1916.

Original application filed April 12, 1913, Serial No. 760,702. Divided and this application filed March 24, 1915. Serial No. 16,702.

*To all whom it may concern:*

Be it known that I, DAVID COLE, a citizen of the United States, residing at Tucson, in the county of Pima and State of Arizona, have invented certain new and useful Improvements in Apparatus for Treating Slimes, of which the following is a specification.

This application is a division of my copending application, Serial No. 760,702, filed April 12, 1913, and relates to the preferred form of apparatus for carrying out the art or method of classifying and concentrating slimes of sulfid copper ores and similar ores, described and claimed in said parent application.

In order that the general principle involved in the invention may be fully understood I shall outline briefly the nature of the material to be handled, and certain characteristics of its behavior in water.

In treating sulfid copper ores by the method hitherto in general use, the greatest unavoidable losses in metal have occurred in that portion of the rejections known as "slimes". Slimes may generally be defined as a mixture of water and comminuted ore and mineral capable of passing readily a screen having openings twenty-five ten-thousandths (0.0025) of an inch square. Heavy tonnages of such slimes must be handled in all cases in which the metallic elements to be recovered are so disseminated throughout the ore as to require fine grinding.

The difficulty in handling such slimes arises from the presence in them of a large percentage of what have come to be known in the art as colloids, as contradistinguished from crystalloids or crystalline metallic sulfids and other generally crystalline metallic compounds. As a general rule the so-called colloids contain a relatively small percentage of metallic values in sulfid form and their presence always greatly hinders the concentration of such values from the crystalline material because of a characteristic flocculent arrangement which the colloids assume almost as soon as the slime comes to rest and solids begin to settle.

By a careful series of tests I have determined the characteristic behavior of such slimes during the settling action. When the settling first begins, and before the colloids have had an opportunity to assume their flocculent arrangement, the settling of the crystalline particles is very little impeded by the colloids, and takes place rapidly, so that a small percentage of the crystalloids, generally the larger particles, readily settles to the bottom of the relatively deep vessels commonly used. As the colloids assume their characteristic flocculent form the flakes begin to arrest and sustain the smaller crystalloid particles, and as the flocculence becomes more pronounced and the flakes settle into closer contact with one another, larger and larger crystalloid particles are arrested. This settling of the flakes and increased density of the colloid mass takes place slowly, because of the retarded outflow of water from between the flakes, but by the time it has progressed to a point at which the solids form about 7% of the mixture the settling of the crystalloids is greatly impeded and by the time the solids form 10% of the mixture all settling of the "slimed" crystalloids through the flocculent colloids seems to cease. In all types of cones, spitzkastens and other prior devices used in treating this class of material much thickening of the mixture by settling of the flocculent colloids necessarily takes place prior to the settling out of a large percentage of the crystalloids on account of their relatively great depth, and in these prior devices an unduly large proportion of concentratable crystalloids does not reach the bottom and separate, but remain mixed with the colloids, and hence is not recovered.

The tests have further shown that if the slime be sufficiently dilute the settling of the crystalloids is practically unimpeded because of the separation of the colloid flakes, one from the other, thus leaving avenues between them through which the crystalloids may fall, though as the flakes settle a degree of concentration of these will speedily be reached sufficient to obstruct the complete precipitation of the crystalloids.

The above considerations have suggested to me the impracticability of successful concentrating slimes containing colloids by the present practice of thickening the slime in deep vessels prior to feeding it to the slimers and the like; and have suggested the desirability of effecting a preliminary separation and removal of the colloids by taking advantage of the early portion of the settling cycle of the slime in the presence of an excess of water in very shallow vessels.

If the above principles are to be availed of it is desirable that the path of the settling particles be short so that the crystalline particles may reach the point of removal before the colloid flakes have seized them in the rapidly condensing mass. It is also desirable that the colloid mass be removed separately thus leaving a comparatively large percentage of clarified water to be again used as such.

I have successfully carried out my process by making use of the apparatus claimed in the present application, which includes a large settling tank approximately six inches deep to which I feed a dilute slime mixture, for example one containing about 5% of combined crystalloid and colloid solids. The mixture is fed in at one side of the shallow tank, flows slowly across the tank and is discharged over a wide shallow overflow at the opposite side of the tank. The movement of the slime across the tank is characterized generally by a "whole flow" as contradistinguished from a "surface flow."

The shallowness of the tank and the dilute nature of the slime cause a settling out of the crystalloids early in the path of the mixture across the tank, the colloids being carried farther across the tank because of their greater tendency to remain in suspension.

Various slightly different methods of availing of the broad characteristic principle of my invention have been used by me, the most satisfactory involving a repetition of the settling process to secure a better separation and incidentally to recover a proportion of the water used in the process.

The simplest method is of course to make use of a relatively narrow tank with a correspondingly small number of belts, sufficient to include the zone of settling of the crystalloids and usually a limited portion of the zone in which mixed crystalloids and colloids are precipitated. The bulk of the colloids thus overflow, from the tank as tailings with the water, the precipitated material being the concentrates. In order to save part of the water it is preferable however to make use of a much wider tank having a correspondingly larger number of belts, the tank being so designed that all the solids both crystalloid and colloid are successively precipitated and clear water is discharged at the overflow. The belts will then lie in three zones (1) that in which practically only crystalloids are precipitated, (2) that in which substantial proportions of both crystalloids and colloids are precipitated, and (3) that in which practically only colloids are precipitated. The different classes of material are thus removed from the tank by three different sets of belts, and may then be individually treated.

To secure a practical elimination of colloids the water discharged at the overflow is fed together with the precipitates from zones 1 and 2 to a second and narrower tank. Because of the dilute nature of the mixture, complete precipitation takes place in this tank and clear water overflows, and there is a relatively well defined line between the zones of precipitation of colloids and of crystalloids, which are consequently carried out by different sets of belts.

The crystalloid material freed of colloids by any of the above methods is readily treated with a higher degree of recovery of values by concentrating methods well known in the art. If the colloid material contains mineral values it may be subjected to appropriate subsequent treatment to recover them, such as flotation processes, or chemical leaching.

I shall now describe in detail the apparatus which I have developed as a means for carrying out my new art or method.

In the accompanying drawings, Figure 1 is a section through a settling tank embodying my invention, the plane of section being taken on the line 1—1 of Fig. 2; Fig. 2 is an elevation of the right end of the same looking from the right as viewed in Fig. 1; Fig. 3 is an enlarged fragmentary view of a portion of Fig. 1, showing the position of the belt on the bottom of the settling tank, and in the return basin; Fig. 4 is a view of the underside of a belt which I prefer to use in my device for the first two belts counted from the supply side; Fig. 5 is a plan view of the tank showing the general arrangement of the belts, location of the supply and overflow, etc.; Fig. 6 is a flow diagram of the simplest method of practising my invention. Fig. 7 is a flow diagram of the preferred method of practising my invention; and Fig. 8 is a fragmentary vertical section of a modified form of settling tank.

Referring to the drawings, it will be noted that the settling tank proper consists of a bottom or floor 1 flat at its middle portion and gradually sloping upward toward the ends. The sides of the tank 2 are provided with the supply or inlet chamber or enlargement 3 and a side overflow 4 located at a slight distance below the top of the side walls 2 in order that material may flow from the tank in a wide thin sheet. The arrangement of the sides 2, overflow 4 and of the bottom 1 are such that the maximum depth of material in the tank is approximately six inches although this dimension may be departed from according to the character of the material to be handled, and may be more or less.

Running longitudinally in the tank are a plurality of belts 5 the lower sides of the first two belts in the series being preferably formed with the V-shaped ribs or flights 6. The function of these flights is to move toward the edge of the belt any relatively coarse material which may find its way beneath the same so that the belts will not be lifted away from the bottom of the tank by the accumulation of material beneath them. The belts are arranged in pairs, successive pairs being driven in opposite directions. Each belt runs at one end on a live drum or pulley 7 and at the opposite end on an idle drum or pulley 8, the return run of the belt being guided by snub pulleys 9 through a shallow water basin 10 designed to clean and prevent undue wear in the belts. The spray pipes 11 are provided to wash material off the belts as they leave the live pulleys so as to prevent the belts from carrying any solid material on the return run. The live pulleys 7 are mounted in the hoppers or boxes 12 adapted to receive any solid material conveyed out of the tank by the belts, and discharge it through openings 13 into suitable troughs or launders indicated at 14. The arrangement of these launders varies with the particular case as is obvious. Each pair of adjacent live pulleys is driven by a sprocket 15 interposed between them. This is connected by means of a chain 16 to a suitable speed reducing train 17 shown as consisting of gears and sprockets. It might take any of many well known forms. A reducing train 17 is preferably provided for each sprocket 15, or in other words for each pair of belts if necessary, and each reducing train receives its power from one of the line shafts 18 through suitable individual change speed devices indicated at 19. The line shafts are driven by motors such as the electric motors indicated by dotted lines at 20. The speed of movement of each pair of belts may be subjected to individual regulation, by means of the change speed devices 19.

The purpose of arranging the alternate pairs of belts to run in opposite directions is to neutralize the effect of the moving belts upon the flow of material across the tank. Obviously they might all be run in the same direction, but I prefer the arrangement described. Although the dimensions of the tank and belts are subject to considerable variation I have secured very satisfactory results with a tank in which the belts travel about 35 feet under the surface of material in the tank, the belts moving at a speed of about 35 feet per minute. The width of each pair of belts in this device is approximately 50 inches and the number of pairs of belts used and degree of shallowness is dependent upon the nature of the material to be handled and the time required to complete the cycle desired and the method of treatment adopted as already suggested. The dimensions given are only illustrative and I do not limit myself to them.

Where it is desirable to do so I construct these machines so that the return run of belt 5 passes through a second tank 21 underneath the first tank 1, and substantially identical therewith in form and function. See Fig. 8. Thus a double machine is formed without increase in floor space and with only moderate increase in height. However, it is necessary in the case of the lower belt to provide a squeegee 22 set upon the belt and lubricated with water from a spray pipe 23 for the purpose of removing the material brought up to this point by the belt. This squeegee effect is produced by applying a piece of thin rubber or a piece of rubber belting upon the smooth surface of the belt at an angle with its travel so that the material carried on its surface is caused to flow off to one side of the belt and be deposited in the hopper 12 and be adapted to pass out of the spout 13 in the same manner and condition as the product produced on the belt emerging from the upper basin. Where a large tonnage is to be handled this arrangement economizes space and is desirable.

As already suggested the principle involved in the process and apparatus illustrated for practising it, may be utilized in a number of relations differing in detail but fundamentally similar.

In Fig. 6, I illustrate diagrammatically a single tank A having eight belts. The feed from the mill enters at B. The tailings (colloids) overflow at C with the bulk of the water. The concentrates (crystalloids) are precipitated and are carried out with a minimum of water by the belts (here assumed all to move in the same direction for ease in making the diagram). The concentrates from different groups of belts are fed to different clean up machines D, E, F, each of which may, if desired, be particularly adapted to the class of material precipitated on the corresponding belts in the tank.

In Fig. 7, I illustrate diagrammatically a sixteen belt tank G. The feed from the mill enters at H. Clear water overflows at I. The first six belts discharge crystalloids at J; the next five belts discharge crystalloids and colloids in varying proportions at K; and the last five belts discharge colloid tailings at L. The water overflowing at I and the solid material from J and K are fed to a six belt tank M at N. Clear water overflows at O and may be used in any desired manner. The first belt discharges at P; the second at Q and the third and fourth at R to corresponding clean-up machines S, T, and U. The fifth and sixth belts discharge colloid tailings at V.

The material fed to tanks A and G contains about 5% of solids or less in the case of very fine materials. The material fed to tank M is usually much more dilute, and this tank effects a very complete removal of the colloids because of such dilution and because of the comparatively small amount of colloid material present.

As a general rule belts intended to withdraw precipitated colloids must be run slower than is necessary for similar belts for removing crystalloids to avoid eddies which otherwise would keep the colloids in suspension.

Having thus described my invention, what I claim is:—

1. In a device for treating slimes, the combination of a shallow tank closed against any but a transverse flow across the same; means for delivering slime in an extended shallow stream to one side of the tank; belt driving and guiding pulleys; and an endless conveyer belt running on said pulleys, one run of said belt dipping into said tank and traveling substantially horizontally on the bottom thereof in a direction transverse to the direction of flow of material in said tank, and the return run of said belt passing outside said tank.

2. In a device for treating slimes, the combination of a shallow tank closed against any but a transverse flow across the same; means for delivering slime in an extended shallow stream to one side of said tank; a plurality of sets of belt driving and guiding pulleys; and a plurality of endless adjacent and substantially parallel conveyer belts each belt running on a corresponding set of pulleys, one run of each belt dipping into said tank and traveling on the bottom thereof substantially horizontally in a direction transverse to the direction of flow of material in said tank, and the return runs of said belts passing outside said tank.

3. In a device for treating slimes, the combination of a shallow tank closed against any but a transverse flow across the same; means for delivering slime in an extended shallow stream to one side of said tank; a plurality of sets of belt driving and guiding pulleys; a plurality of endless adjacent and substantially parallel conveyer belts each belt running on a corresponding set of pulleys, one run of each belt dipping into said tank and traveling on the bottom thereof substantially horizontally in a direction transverse to the direction of flow of material in said tank, and the return runs of said belts passing outside said tank, and driving means for said belt driving pulleys for driving certain adjacent belts in opposite directions whereby the creation of disturbing currents by the movement of the belts is prevented.

4. In a device for treating slimes, the combination of a shallow tank closed against any but a transverse flow across the same; means for delivering slime in an extended shallow stream to one side of said tank; a plurality of sets of belt driving and guiding pulleys; a plurality of endless adjacent and substantially parallel conveyer belts each belt running on a corresponding set of pulleys, one run of each belt dipping into said tank and traveling on the bottom thereof substantially horizontally in a direction transverse to the direction of flow of material in said tank, and the return runs of said belts passing outside said tank; and individual driving means for groups of adjacent belt driving pulleys, each driving means including a change speed device, whereby the speeds of groups of belts are subject to individual regulation.

5. In a device for treating slimes, the combination of a pair of superposed shallow settling tanks each closed against any but a transverse flow across the same; means for delivering slime in an extended shallow stream to one side of each tank; a plurality of endless adjacent and substantially parallel conveyer belts one run of each belt dipping into one tank and traveling on the bottom thereof in a direction transverse to the flow therein and the other run of each belt dipping into the other tank and returning on the bottom thereof in a direction transverse to the flow therein; and means for guiding and driving said belts.

In testimony whereof I have signed my name to this specification.

DAVID COLE.